United States Patent [19]

Eastman et al.

[11] Patent Number: 4,677,873

[45] Date of Patent: Jul. 7, 1987

[54] TRANSFER CASE WITH INTER-AXLE DUAL-PLANETARY DIFFERENTIAL

[75] Inventors: Richard E. Eastman, Central Square; Randolph C. Williams, Weedsport, both of N.Y.

[73] Assignee: Chrysler Motors Corporation, Highland Park, Mich.

[21] Appl. No.: 812,661

[22] Filed: Dec. 23, 1985

[51] Int. Cl.⁴ .......................................... F16H 37/08
[52] U.S. Cl. .................................. 74/665 GE; 74/740; 74/714; 180/250
[58] Field of Search ............... 74/665 GE, 710, 710.5, 74/714, 740; 180/247, 248, 249, 250

[56] References Cited

U.S. PATENT DOCUMENTS

| | | | |
|---|---|---|---|
| 1,235,249 | 7/1917 | Salfisberg | 74/714 X |
| 2,927,654 | 3/1960 | Lee | 180/250 |
| 2,946,239 | 7/1960 | Hait | 74/710.5 |
| 3,060,765 | 10/1962 | Rinsoz | 74/710.5 |
| 3,899,938 | 8/1975 | Crabb | 74/714 X |
| 3,908,775 | 9/1975 | Van Fossen | 180/250 |
| 4,103,753 | 8/1978 | Holdeman | 180/247 |
| 4,440,042 | 8/1984 | Holdeman | 74/785 |
| 4,538,700 | 9/1985 | Suzuki | 180/249 X |
| 4,552,241 | 11/1985 | Suzuki | 180/249 |

FOREIGN PATENT DOCUMENTS 986278  3/1965  United Kingdom ................ 180/248

Primary Examiner—Leslie Braun
Assistant Examiner—Dwight G. Diehl
Attorney, Agent, or Firm—Edward P. Barthel

[57] ABSTRACT

A dual planetary differential for a two wheel/four wheel drive vehicle transfer case mechanism providing an unequal torque split between the front and rear wheels during its full-time four wheel drive operation. The dual planetary gear set may be shifted by means of a mode clutch to provide either four wheel drive with full-time differentiation between the front and rear wheels or a part-time four wheel drive mode wherein the dual planetary is in a locked-up condition. The first and second sun gears of the dual planetary have unequal diameters with differing numbers of teeth such that, for example, proportionally more torque is transferred to the rear wheels than the front wheels. The sun gears have complementary frusto-conical web portions arranged in a juxtaposed compact manner within the transfer case.

8 Claims, 7 Drawing Figures

| Transfer Case Shift Pos. | Title | Range Clutch | Mode Clutch |
|---|---|---|---|
| No. 1 | 2 WH | Pos A | Pos X |
| No. 2 | 4WH Lock | Pos A | Pos Y |
| No. 3 | 4 WH Full Time | Pos A | Pos Z |
| No. 4 | Neutral | Pos B | Pos Z |
| No. 5 | 4W Low Lock | Pos C | Pos Y |

TRANSFER CASE WITH INTER-AXLE DUAL-PLANETARY DIFFERENTIAL

BACKGROUND OF THE INVENTION

This invention relates to a transfer case differential mechanism for a four-wheel drive vehicle, and more particularly to a dual-planetary differential incorporating torque-splitting capability in a compact and simplified manner.

The prior art contains a large number of four-wheel drive vehicles that have utilized planetary differential gearing systems. The U.S. Pat. 3,420,121 to R. W Stieg discloses a torque dividing spur gear differential for multiple driven rear axles on a vehicle. The Stieg patent shows a spur gear differential in which each set of planetary pinions on the differential carrier comprise a reducing gear train between the differential side gears. Another planetary torque proportional differential is disclosed in U. S. Pat. No. 3,899,938 to E. R. Crabb. This patent provides a torque transfer system for a two-axle vehicle including a planetary torque proportioning differential for proportioning input torque between first and second coaxially disposed, relatively rotatable output shafts which are operatively connected to first and second axles, respectively.

BRIEF DESCRIPTION OF THE INVENTION

An object of the present invention is to provide a transfer case dual-planetary differential employing dual sun gears and dual planet gear sets in a compact improved structure that achieves differential action and unequal torque splitting by the sun gears which may be selectively connected to front and rear axles of a four-wheel drive vehicle.

The invention achieves this object in an inter-axle dual-planetary differential transfer case which functions to divide the input torque, supplied to front and rear axle output shafts, in a manner proportional to the number of teeth on first and second sun gears of different diameters. The first sun gear is fixed to the rear axle output shaft while the second sun gear is journally supported on the rear wheel output shaft. The second sun gear drivingly engages a chain sprocket which is operatively connected to the front axle output shaft. A first set of full-length planet gears mesh with the first large diameter sun gear while a second set of half-length planet gears has each of its planets intermeshed with both the second smaller diameter sun gear and an associated first set full-length planet gear.

The transfer case includes a gear reduction planetary assembly having its sun gear integral with its input shaft. A coaxial output shaft, drivingly connected to the vehicle rear wheels, has a pilot portion journaled within the end of the input shaft. The dual planetary differential has its first sun gear splined to the rear axle output shaft and its second sun gear journally supported thereon. A drive sprocket is splined to an axial flange of the second sun gear and connected, via a drive chain, to a front axle drive shaft for driving the vehicle front wheels. An intermediate sleeve is journaled on the output shaft and extends between the gear reduction planetary and the dual planetary differential.

A range clutch collar and a mode clutch collar are each splined to the intermediate sleeve for reciprocal travel relative to each other and the intermediate sleeve. The intermediate sleeve has external range collar engaging spline means at one end and external mode collar engaging spline means at the other end. The range clutch collar and the mode clutch collar are each selectively movable to three positions on the intermediate sleeve. In the transfer case of the present invention, selective independent movement of the range and mode clutch collars results in a total of five transfer case operating states or positions.

The transfer case first state provides two wheel drive high range torque operation with both the range clutch and the mode clutch collars in their first positions. In this first state external splines on the range clutch collar engage internal splines of the gear reduction planetary sun gear while external splines on the mode clutch collar engage internal splines on the first sun gear of the dual planetary differential.

The transfer case second state provides four wheel high range lock-up operation with the range clutch collar remaining in its first selective position and the mode clutch collar being shifted to its second position. In the transfer case second operating state the mode clutch collar external splines engage internal splines of both the dual planetary differential first sun gear and its carrier. In transfer case four wheel high lock-up second operating state the dual planetary differential is locked up thus providing no interaxle, i.e., front axle to rear axle differentiation.

The transfer case third state provides four wheel drive high range full time operation with the range clutch collar remaining in its first selective position and the mode clutch collar being shifted to a third selective position. In the transfer case's third operating state the mode clutch collar external splines engage only the internal splines of the dual planetary differential carrier. In the transfer case's third state the dual planetary differential is unlocked allowing it to function as a full time interaxle differential.

The transfer case fourth state provides a neutral condition with the range clutch collar moved to a second selective position wherein the range clutch collar external splines are not engaged and the mode clutch collar remains in its third position. In the fourth transfer case state no input power is transferred from the input shaft to the intermediate sleeve and thus no output torque is delivered to either front or rear axle. The neutral state permits front and rear axle differentiation when the vehicle is being towed.

The transfer case fifth state provides four wheel drive low range lock-up operation with the range clutch collar moved to a third selective position engaging the reduction planetary carrier. In addition, the mode clutch collar is returned to its second position wherein the mode clutch collar external splines engage the internal splines of both the dual planetary differential first sun gear and its carrier. In its fifth state the dual planetary differential is again locked-up wherein no interaxle differentiation is provided.

A feature of the present invention is to provide an inter-axle dual planetary differential for a vehicle transfer case as set forth above wherein a larger percentage of the input torque is supplied to the rear axle and a corresponding smaller percentage of the input torque is supplied to the front axle in the transfer case four wheel drive high operating position with the dual planetary differential providing vehicle full-time interaxle differentiation.

Another feature of the invention is to provide an inter-axle dual planetary differential for a vehicle transfer case as set forth above wherein a first large diameter sun gear has a frusto-conical shaped web portion nesting within a frusto-conical web portion of a second smaller diameter cone-shaped sun gear in a compact juxtaposed manner wherein the first sun gear provides internal shift clutch teeth for selective engagement with an externally splined clutch collar.

Still another feature of the present invention is to provide dual-planetary differential arrangement for a torque transfer assembly wherein back-lash thrust forces, which occur in bevel gear differentials, are obviated on the planetary carrier and and its planet gears.

It is still another feature of the present invention to provide a dual planetary differential as set forth above wherein a double-piloted carrier and dual sun gear concentric arrangement result in a rotationally stabilized structure.

BRIEF DESCRIPTION OF THE DRAWINGS

The objects, features and advantages of the present invention are readily apparent from the following detailed description of the best mode taken in conjunction with the accompanying drawings in which.

DESCRIPTION OF THE PREFERRED EMBODIMENT

Figure 1:
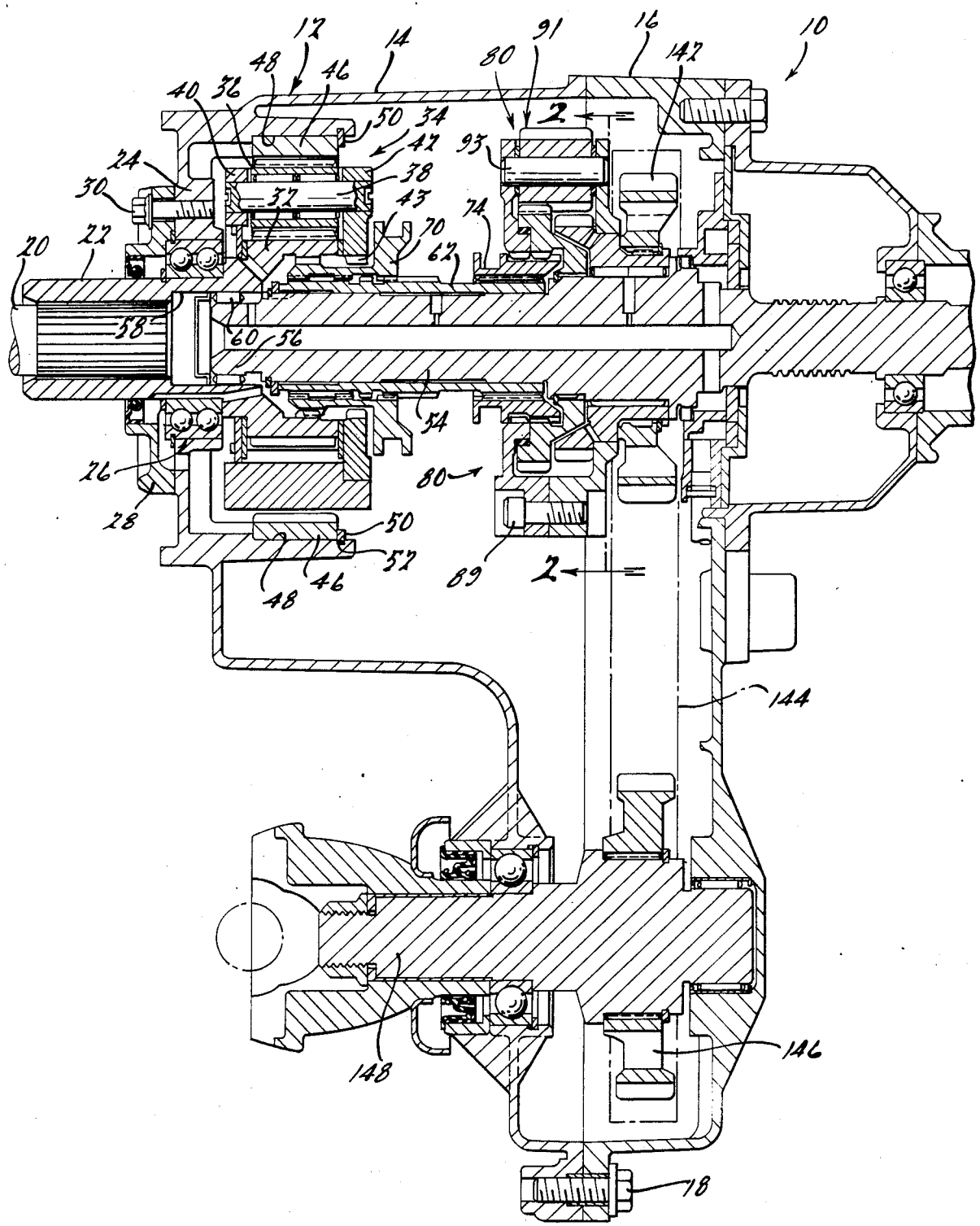
FIG. 1 is a sectional view of a transfer case showing the inter-axle dual planetary differential of the present invention.

Referring now to the drawings, there is shown in FIG. 1 the drive train of a full-time/part-time four-wheel drive transfer case 10 for a four-wheel drive vehicle. The transfer case 10 includes a housing assembly 12 formed by front and back half-sections 14 and 16, respectively, suitably connected by a plurality of threaded bolts 18. The front half-section 14 receives a vehicle transmission output shaft 20 within an outer end of an internally splined transfer case input stub shaft 22 as disclosed generally, for example, in U.S. Pat. No. 3,848,691 issued Nov. 19, 1974 to Dolan. The stub shaft 22 is shown rotatably mounted in hub portion 24 of the front half section 14 by ball-bearing assembly 26 and sealingly enclosed by collar member 28 secured by bolts 30.

The input stub shaft 22 has an input sun gear 32, of a helical planetary gear set reduction assembly 34, formed integral with its inner end. The helical sun gear 32 is meshed with a plurality of helical planet gears one of which is shown at 36. Each planet gear 36 is rotatably journaled on a pin 38 supported in a first planetary carrier. The first planetary carrier includes fore and aft carrier rings 40 and 42, suitably secured as by machine bolts (not shown). It will be noted that the aft ring 42 is formed with internal splines 43 concentrically arranged about the longitudinal axis of the input shaft 22. The helical planet gears 36 mesh with a helical annulus ring gear 46 suitably mounted in a splined press-fit manner, for example, to an inner annular surface 48 formed in the housing front half-section 14. The annulus gear 46 is also retained against rearward axial movement by a snap ring 50 received in an internal annular notch 52.

Figure 5:
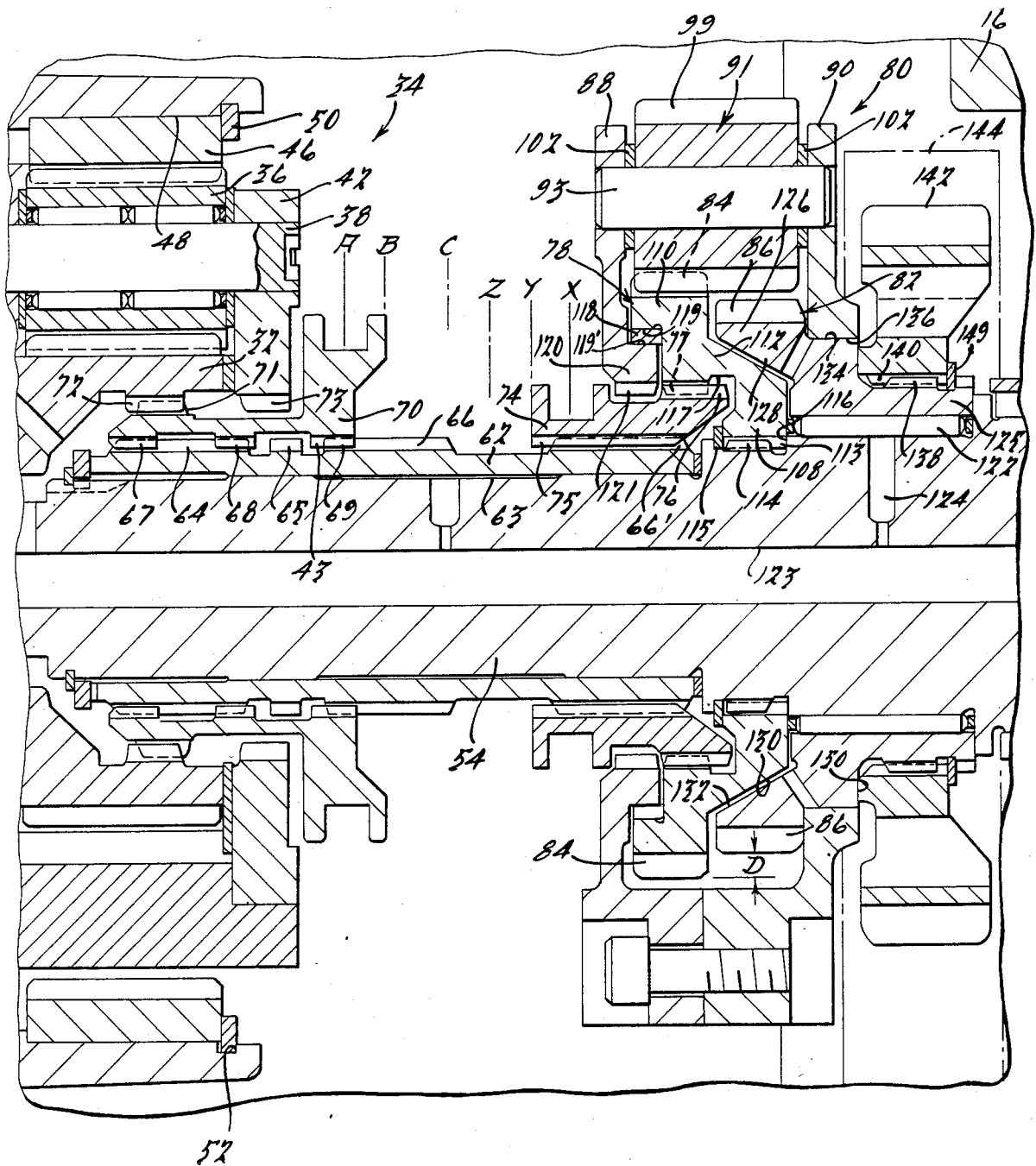
FIG. 5 is an enlarged view of the helical and dual differential planetary portions of FIG. 1.

As best seen in FIG. 1, an output shaft 54, aligned on the longitudinal axis of the input shaft 22, has a pilot end portion 56 journaled in input shaft axial counter bore 58 by roller bearings 60. The output shaft 54 is surrounded by a concentric intermediate clutch sleeve 62 journally supported thereon at 63 for relative rotation therewith. The intermediate sleeve 62 has external longitudinally spaced sets of splines 64, 65 and 66 selectively engagable with internal sets of splines 67, 68 and 69 on axial shiftable range clutch collar 70 shown concentrically surrounding the forward end of sleeve 62. The range clutch collar 70 has external splines 71 for selective slidable engagement with internal splines 72 on helical sun gear 32 and internal splines 73 on aft carrier ring 42. The range collar 70 is shown in FIGS. 1 and 5 in its two-wheel drive high range position indicated by the construction line A. With the range clutch collar in its A position engine torque or power flows from the input shaft 22 and its integral sun gear 32 to the intermediate sleeve 62 by engaged sets of splines 71, 72 and 64, 67.

An axially shiftable mode clutch collar 74 concentrically surrounds the aft end of sleeve 62. The mode clutch collar is shown in FIG. 5 in its two-wheel drive high range position, indicated by solid construction line X, with its internal splines 75 slidably engaged with sleeve external splines 66'. Further, with the mode clutch collar 74 shown in its extreme right or X position its external splines 76 engage internal splines 77 on first or left sun gear 78 of a dual planetary differentially generally indicated at 80. The left sun gear 78 along with a second right sun gear 82 are positioned in a concentrically surrounding axially juxtaposed manner on the output shaft 54. The left sun gear 78 has its periphery gear teeth 84 located at a first predetermined radial distance from the principal axis of the output shaft 54. The right sun gear 82 has its peripheral gear teeth 86 located at a second predetermined lesser radial distance form the principal axis of the output shaft 54. As viewed in FIG. 4 the right sun gear teeth 86 are a defined radial distance "D" less than the radial distance of the left sun gear teeth 84.

Figure 2:
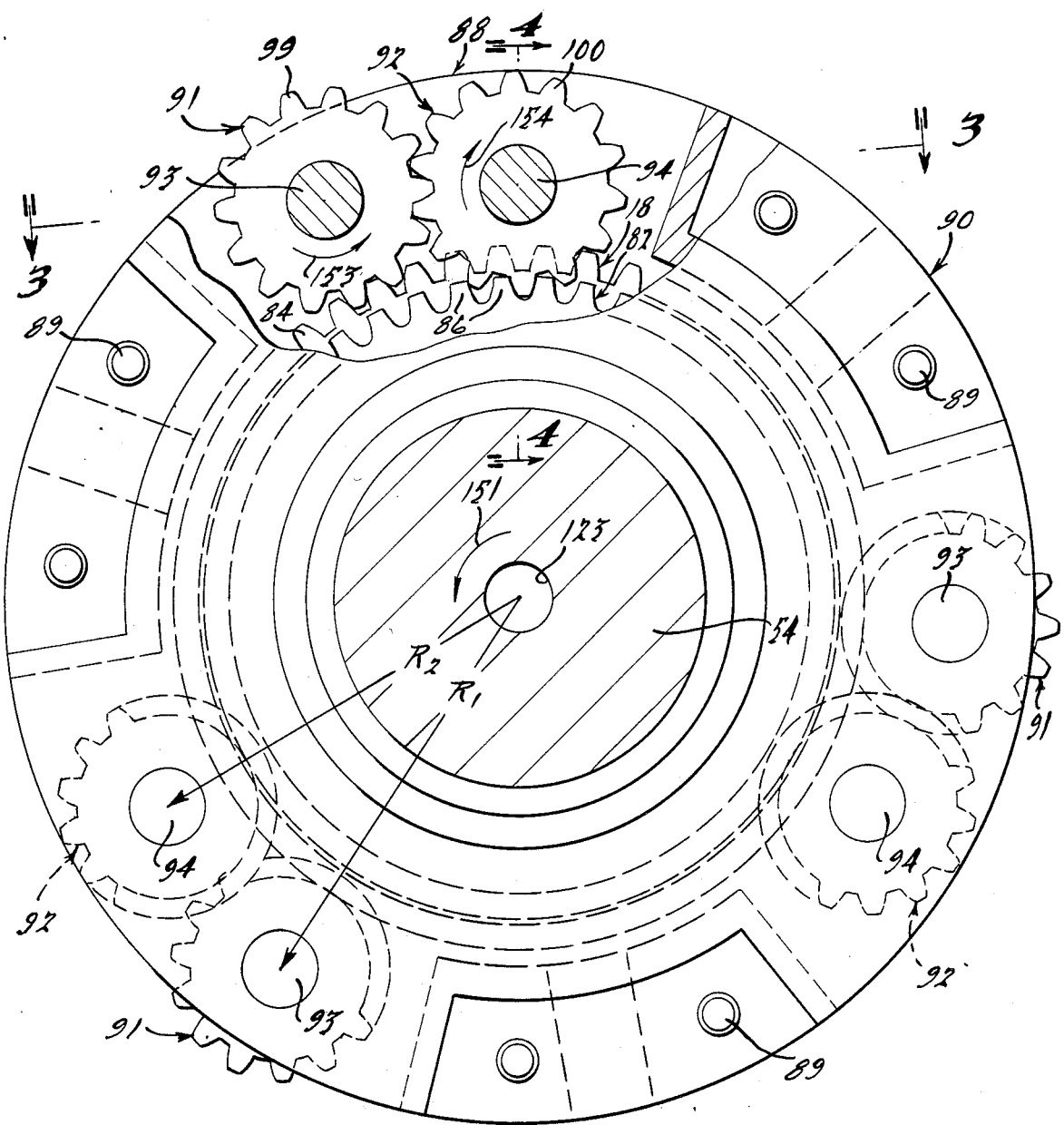
FIG. 2 is an enlarged vertical elevational view, taken substantially on line 2—2 of FIG. 1 with parts broken away, of the dual-planetary differential.
Figure 3:
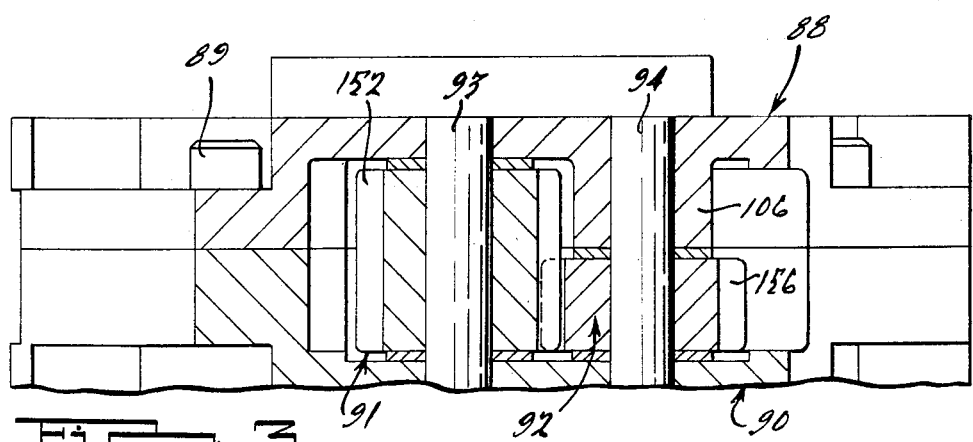
FIG. 3 is a horizontal elevational view of the dual-planetary differential of FIG. 2.
Figure 6:
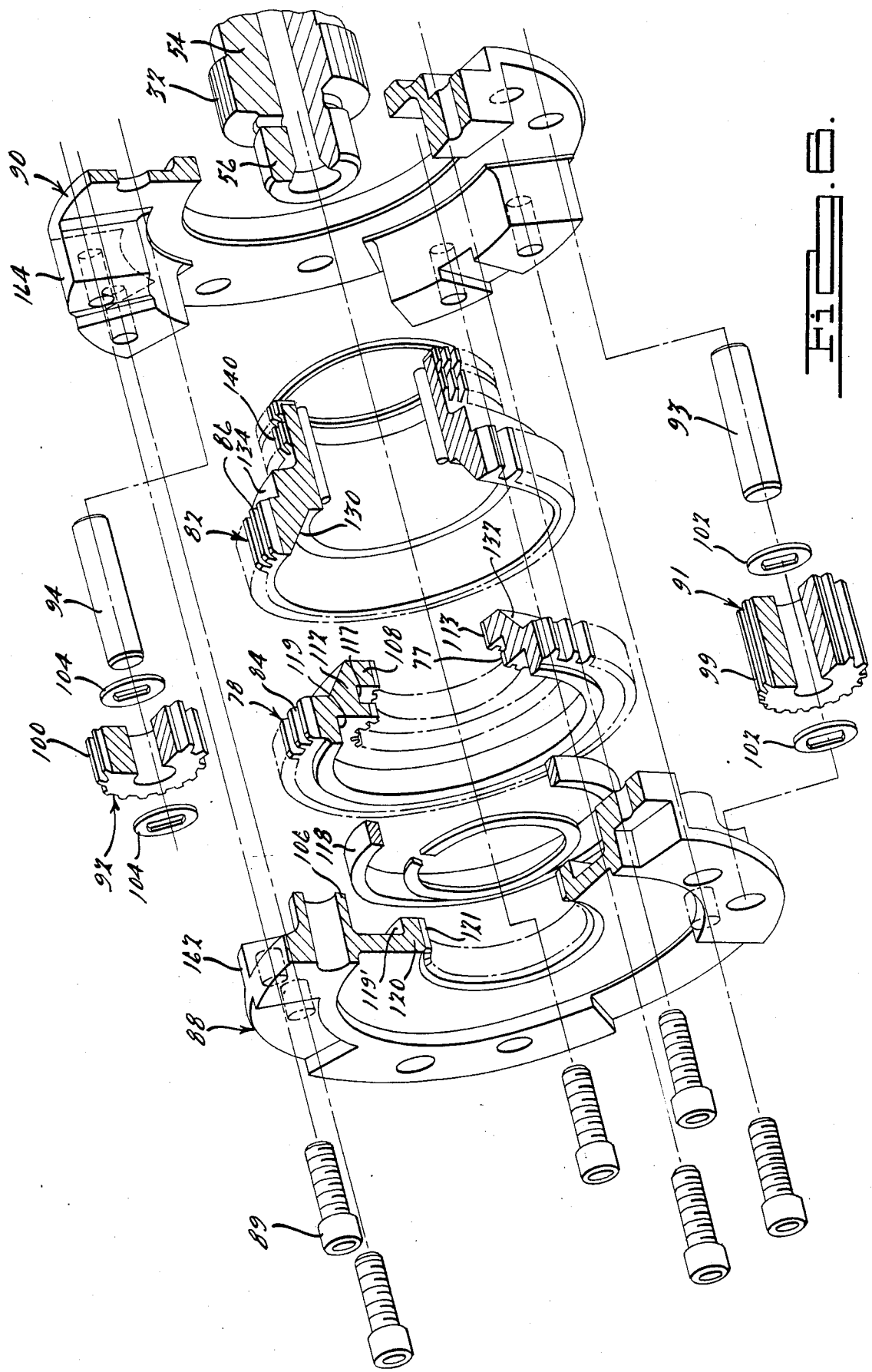
FIG. 6 is an exploded perspective view with parts broken away of the dual-planetary differential.

As best seen in FIGS. 2, 3 and 6, the dual planetary differential 80 has a carrier with a forward or left carrier ring 88 and an aft or right carrier ring 90. The carrier rings, secured by threaded bolts 89, rotatably support first full-length 91 and second half-length 92 sets of planet gears by means of their associated pins 93 and 94, respectively. The first set of full-length planet gears 91 extend longitudinally substantially the full axial extent between the left and right carrier rings 88 and 90, as seen in FIG. 3. The second set of reduced of half-length planet gears 92 (FIG. 4) extend longitudinally substantially one-half the axial extent between the left and right carrier rings 88 and 90. It will be noted in FIG. 2 that both the full-length gears 91 an the half-length gears 92 have identical diameters and cross sections. Thus, the equal diameter planet gears 91 and 92 are formed with the same number of gear teeth, i.e., fourteen gear teeth in the preferred embodiment.

Figures 4, 7:
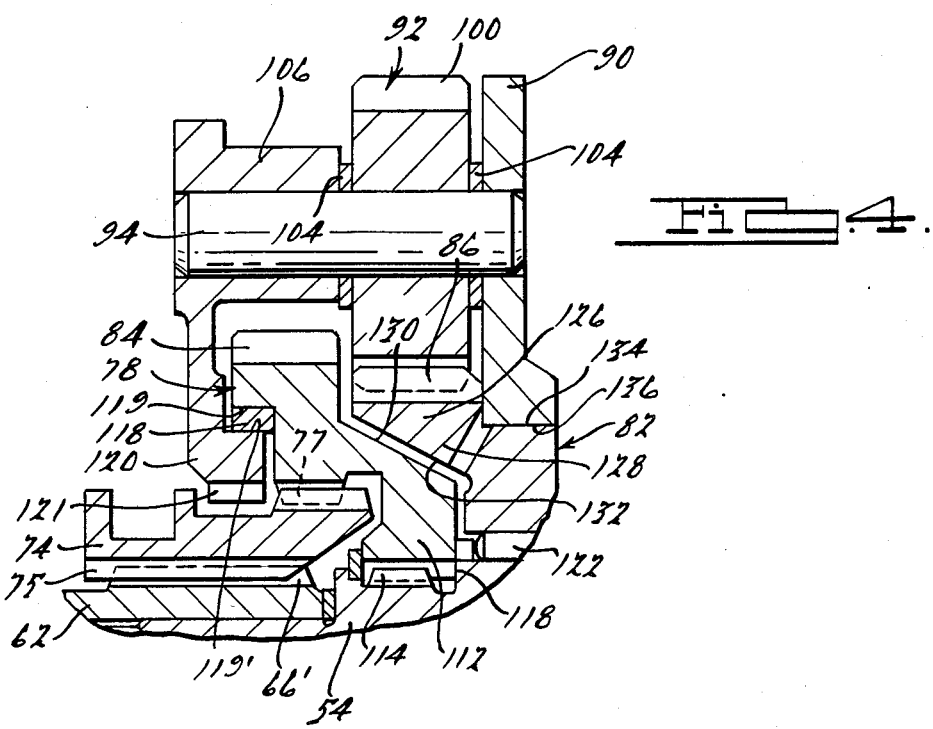
FIG. 4 is a fragmentary vertical sectional view taken on line 4—4 of FIG. 2.
FIG. 7 illustrates a table of the five operating states which may be selected by the transfer case according to this invention.

As seen in FIG. 2 the pins 93 of full-length planet gears 91 have their pin axis located at a first radius $R_1$, a predetermined greater radial distance outwardly from the axis of output shaft 54 than the half-length gear's pins 94 second radius $R_2$. Thus, the first sun gear teeth 84 engage only the gear teeth 99 of the full-length planet gears 91 while the second sun gear teeth 86 engage only the gear teeth 100 of the half-length planet gears 92. FIG. 5 shows a pair of washers 102 provided on carrier pin 93 between the ends of full-length planet gear 91 and the respective ring members 88 and 90 to axially align the planet gears. FIG. 4 shows a pair of washers 104 provided on carrier pin 94 between the ends of half-length planet gears 92 and the respective ring member 90 and axial bosses 106. The axial bosses 106 are formed on the inner surface of the left carrier ring 88 to compensate for the reduced axial dimension of the half-length planet gears 92.

As best seen in FIG. 5 the first sun gear 78 has an inner radial extending hub portion 108 axially offset rearwardly from an outer radially extending rim portion 110 by means of a frusto-conical sectioned web portion 112. The first sun gear hub portion 108 has internal splines 113 engaged with external splines 114 formed on the output shaft 54. The hub portion 108 is axially located on the shaft 54 between retention snap ring 115, engaging one face of the hub portion 108, and radial stop shoulder 116 engaging the opposite aft face of the hub portion.

It will be noted in FIGS. 5 and 6 that the left sun gear 78 has its web portion 112 forward facing surface formed with an annular recess 117 formed with the internal spline teeth 77. The spline teeth 77 have every other tooth eliminated to provide ease of shifting in a manner to be explained. Further, an annular bearing or bushing ring 118 is positioned intermediate internal annular shoulder 119 notched-out of the first sun gear rim portion 110 and external annular shoulder 119' of the left ring 88 to journally align the first sun gear 78 thereon. The dual planetary carrier first ring 88 has a rearwardly extending axial flange portion 120 defining a concentrically disposed circular opening formed with internal splines 121 axially aligned with the first sun gear internal spline teeth 77. The left ring external annular shoulder 119' is also formed on flange portion 120.

The second sun gear 82 is journally supported on the output shaft 54 for relative rotation thereto by suitable bearing means. In the disclosed form needle or roller bearings 122 are supplied with lubrication from axial bore 123 by means of radial oil passage 124. FIG. 5 shows the second sun gear 82 formed with an inner axially extending hub portion 125 offset rearwardly from an outer toothed rim portion 126 by means of a frusto-conical sectioned web portion 128. It will be noted in FIG. 4 that the web portions 112 and 128 define complementary juxtaposed nested convex 130 and concave 132 frusto-conical surfaces, respectively. As a result the first sun gear web portion 112 and its hub portion 108 partially nest within the second sun gear concave frusto-conical portion, defined by surface 132, thus achieving a compact space-saving arrangement. The second sun gear web portion 128 has a notched-out annular external shoulder 134 formed therein adapted to concentrically receive and journally support the aft carrier ring 90 by means of its circular opening 136.

With reference to FIG. 5, the axial flange portion 125 of the second sun gear 82 has external splines 138 which engage internal splines 140 of a drive sprocket 142. The second sun gear flange portion 125 thus carries the drive sprocket 142 for rotation therewith. A chain 144 driven by the sprocket 142, in turn, rotates a driven sprocket 146 driving a first front axle driving shaft 148. The drive sprocket 142 is fixed on flange portion 125 between snap ring 149 and radial annular shoulder 150 formed on the second sun gear web portion 128.

With reference to the shift position state No. 1 of the FIG. 7 chart, it will be seen that in the transfer case two wheel drive high range shift position, the range clutch collar 70 is located at position A and the mode collar 74 is at its FIG. 5 position X. As stated above, the torque or power flow is transferred from the input shaft integral sun gear 32 to the intermediate sleeve 62 by engaged splines 67, 64, and 71, 72. Power flows through the engaged sleeve external splines 66' and mode collar internal splines 75 and thence, via mode collar external splines 76, to the dual planetary first sun gear internal spline teeth 77. The power then flows from the first sun gear hub portion internal splines to the output shaft external splines 114 and thence to the vehicle rear wheels (not shown). No torque is transmitted to the front wheel driving shaft 148 in shift state No. 1.

Upon the transfer case being placed in its four-wheel drive high range lock state, shown at position No. 2 of the FIG. 7 chart, the range clutch collar 70 remains at its position A while the mode clutch collar 74 is shifted leftward to its position Y. In its Y position the mode clutch collar external splines 76 engages both the first sun gear internal splines 118 and the left carrier ring internal splines 121. This results in the power flow from the mode clutch collar 74 being coupled both to the left carrier ring 88 and the left sun gear 78. Thus, the dual planetary carrier rings 88 and 90 and left sun gear 78 are locked against relative rotation. As the front wheel drive shaft 148 is positively rotated by drive chain 144 at the same speed as the rear wheel output shaft 54 there is no interaxle differentiation.

Upon the transfer case being placed in its full time four wheel drive state, indicated at position No. 3 of the chart of FIG. 7, the range clutch collar 70 remains at its position A while the mode clutch collar 74 is moved leftward to position Z. In its Z position the mode clutch collar external splines 76 engage only the internal splines 121 of the carrier left ring 88. As a result the power flow from the sleeve 62 and the mode clutch collar 74 is split between the first 78 and second 82 sun gears. That is, the first sun gear 78 drives the rear wheel output shaft 54 and the second sun gear 82 drives the sprocket 142 and chain 144 which in turn drives the front wheel output shaft 148. As a consequence the inter-axle dual planetary 80 provides torque split differentiation between the first sun gear torque applied to the vehicle rear axle via the rear wheel output shaft 54 and the second sun gear torque applied to the vehicle front axle via the front wheel output shaft 148.

A feature of applicants' dual planetary differential is that the torque of input shaft 22 is divided between the rear axle output shaft 54 and the front axle driving shaft 148 in a ratio proportional to the number of gear teeth on each of the first 78 and second 82 sun gears. In the disclosed form the first larger diameter sun gear 78 has 50 gear teeth indicated at 84 in FIG. 6. FIG. 2 shows the first sun gear teeth 84 meshing with the teeth 99 of the three equally spaced full-length planet gears 91. As mentioned above, each planet gear 91 has 14 gear teeth. With reference to FIGS. 2 and 6, the second smaller diameter sun gear 82 has 46 teeth, indicated at 84, meshing with the 14 gear teeth 100 of the three equally spaced half-length planet gears 92. It will be noted that the teeth 99 of each full length planet gear 91 mesh with the teeth 100 of its associated half-length planet gear 92 in addition to meshing with the first sun gear teeth 84.

With reference to the operating state No. 3 of the transfer case it will be seen that the external splines 76 of the mode clutch collar 74 are lockingly engaged with the internal splines 121 of the dual planetary differential left carrier ring 88. Thus, both the right 90 and left 88 carrier rings are free to rotate relative to the output shaft 54. As a consequence the dual planetary 80 provides torque split differentiation between the left sun gear 78 torque applied to the vehicle rear wheels via rear axle output shaft 54, and the right sun gear 82 torque applied to the vehicle front axle, via front wheel driving shaft 148.

With reference to the neutral operating state of chart position No. 4 (FIG. 7) it will be seen that the range clutch is moved rightward to position B. In its B position, the range clutch external splines 71 are axially spaced between the interval splines 72 and 73 and thus the clutch 70 is disengaged from the reduction planetary 34 so that no power flows to intermediate sleeve 62. The mode clutch remains in position Z but, of course, receives no power flow from the intermediate sleeve 62.

FIG. 7 shows a four wheel low range lock operating state at chart position No. 5 where the range clutch 70 is moved rightward to position C. In its C position, the range clutch external splines 71 are in engagement with the internal splines 73 of the gear reduction planetary aft carrier ring 42. Thus, low range power is transferred from the planet gears 36 and carrier ring to the intermediate sleeve 62. The mode clutch 74 is moved rightwardly back to its Y position wherein its external splines 76 engage both the internal splines 121 of ring 88 and 118 of the left sun gear 78. Thus, the dual planetary 80 is again locked-up and four wheel drive low range is provided with no differentiation between the output shafts 54 and 148.

By virtue of the arrangement of having first and second sun gears of unequal diameters and with unequal number of gear teeth the inter-axle dual planetary differential provides proportional torque splitting to the rear and front axles. In the disclosed embodiment, wherein the left sun gear 78 has 50 gear teeth and the right sun gear 82 has 46 gear teeth, the rear axle output shaft 54 receives about fifty two percent of the input torque from input shaft 22 and the front axle output shaft 148 receives about forty-eight percent of the input torque from shaft 22. Applicants' design makes possible an improved compact dual planetary differential arrangement in a four-wheel drive transfer case vehicle wherein increased torque is furnished to the rear wheels while a corresponding lesser torque is applied to the front wheels. It will be appreciated that by varying the ratio of gear teeth between the left and right sun gears, applicants' design achieves a plurality of front axle to rear axle torque splits to suit the driving and handling requirements of a variety of four-wheel drive vehicles.

The rotation of the output shaft 54 is conventionally counterclockwise, as viewed by the arrow 151 in FIG. 2, during forward travel of the vehicle. It will be noted that during forward travel of the vehicle the dual planetary carrier is rotated in a counter clockwise direction such that each full-length planet gear 91 leads its associated half-length planet gear 92. As a consequence the full-length planet gears 91 are rotated in a counterclockwise direction as indicated by arrow 153 and the half-length planet gears 92 are rotated in a clockwise direction as indicated by arrow 154. Applicants' planet gear arrangement causes substantially equal and opposed thrust or reaction forces being exerted on the planet gear teeth 99 and 100. As a result the opposed forces are effectively cancelled. Thus, minimal planet gear bearing loads are experienced during forward travel of the vehicle.

In the form of the invention shown a plurality of axially extending tenon members 162 are shown in FIG. 6 formed on the left carrier ring 88. The tenon members 162 are sized for interlocking engagement with mortise-like axial notches 164 on right carrier ring 90. It will be noted that other interlocking means could be used, such as dowels for example, as this is merely a choice in design.

Another feature of the dual planetary arrangement involves a double-piloted carrier design that stabilizes the differential carrier during rotation on shaft 54. The first pilot external annular notched out shoulder 134 is formed on the right sun gear 82 concentric with the inner circular opening 136 formed in the right carrier ring 90. The second pilot external shoulder 119' receives the bushing 118 which is supported in concentric annular internal shoulder 119 of the left sun gear 78. Thus, the left carrier ring and left sun gear shoulders 119' and 119 together with the right sun gear shoulder 134 and concentric opening 136 provide a double piloted structure insuring concentric rotation of the dual planetary differential on the shaft 54.

While only one embodiment of the invention has been described, others are possible without departing from the scope of the appended claims.

What is claimed is:

1. In a transfer case apparatus adapted for driving a four wheel drive motor vehicle having front and rear ground engaging wheels, said apparatus including a housing, an input shaft adapted for connection to a transmission of the motor vehicle, a pair of first and second output shafts supported for rotation in said housing, said first output shaft adapted for driving connection to the rear ground engaging wheels and said second output shaft adapted for driving connection to the front ground engaging wheels, and a dual helical palentary differential gear assembly arranged in a compact manner for proportioning torque between said first and second output shafts, said dual planetary differential helical gear assembly comprising a dual planetary carrier including first and second longitudinally spaced carrier rings rotatable about the central axis of said first output shaft, said first carrier ring having a central opening formed with internal splines concentrically disposed about said first output shaft, first and second juxtaposed toothed helical gun gears concentrically disposed about said first output shaft, said first sun gear fixed to said first output shaft and having its teeth at a first uniform radius, said second sun gear journalled on said first output shaft and having its teeth at a second uniform radius a predetermined distance less than said first sun gear teeth radius, means interconnecting said second sun gear with said second output shaft, first and second sets of spur-type toothed pinion gears having identical uniform diameters rotatably supported on first and second, respective, sets of pins disposed parallel to said central axis, said first and second sets of pins journalled between said carrier rings at first and second radial distances, respectively, outward from said central axis, wherein said first radial distance is a predetermined distance greater than said second radial distance, the teeth of each said first set pinion gear extending a first predetermined axial distance substantially equal to the axial extent of both said first and second sun gear teeth, the teeth of each said first set pinion gear positioned in meshing engagement with said first sun gear teeth while forming a predetermined clearance with said second sun gear teeth, the teeth of each said second set pinion gear extending a second longitudinal distance about one-half the axial extent of each said first set pinion gear teeth so as to be substantially equal to the axial extent of said second sun gear teeth and in meshing engagement with said second sun gear teeth, said first asnd second sets of pinion gears disposed in paired relation such that each said first set pinion gear teeth in meshing engagement with a corresponding second set pinion gear teeth, said first sun gear having a predetermined number of gear teeth greater than the number of gear teeth on said second sun gear, a mode clutch collar having external spline thereon being axially movable relative to said dual planetary differential to a position wherein its external splines slidably engage said first carrier ring internal splines, and clutch means operative when engaged to drivingly interconnect said mode clutch collar with said input shaft, such that with said mode clutch collar external splines being in engagement with said first carrier ring internal splines and said clutch means being engaged differentiation is provided by said dual planetary differential between said first and second output shafts, and wherein the drive torque supplied to said input shaft is divided between said first and second output shafts in a ratio proportional to the number teeth on said respective first and second sun gears.

2. The transfer case apparatus as set forth in claim 1 wherein an intermediate sleeve having first and second externally splined portions, said intermediate sleeve concentrically surrounding said first output shaft for relative rotation therewith, said clutch means in the form of a range clutch collar concentrically surrounding said intermediate sleeve first externally splined portion, said range clutch collar having internal splines slidably engaging said intermediate sleeve first externally splined portion such that said range clutch collar being adapted to selectively connected said input shaft to said intermediate sleeve via gear reduction means, said mode clutch collar concentrically surrounding said intermediate sleeve second externally splined portion and having internal splines slidably engaging said intermediate sleeve second externally splined portion, said first sun gear having an annular recess therein formed with internal splines axially aligned with and adajcent to said first carrier ring internal splines, said mode clutch collar adapted to be shifted axially into said first sun gear annular recess such that its external splines engage only said first sun gear internal splines, wherein said first output shaft driven by drive torque transferred thereto from said input shaft via said gear reduction means, said range clutch collar, said intermediate sleeve, said mode clutch collar and said first sun gear; and wherein upon said mode clutch collar being shifted axially away from said first sun gear a predetermined distance such that its external splines engage both said first sun gear internal splines and said first carrier ring internal splines, whereby said dual planetary differential is placed in a lock-up condition with no differentiation provided between said first and second output shaft, and whereby upon said mode clutch collar being shifted axially away from said first sun gear a second predetermined distance wherein its external splines engage only said first carrier ring internal splines provided said differentiation by said dual planetary differential between said first and second output shafts.

3. The torque transfer assembly as set forth in claim 2, wherein said first sun gear having an outer radially extending toothed rim portion and an inner radially extending hub portion rearwardly offset from said rim portion, said first sun gear rim and hub portions being joined by a frusto-conical web portion, said frusto-conical web portion defining said first sun gear internally splined annular recess.

4. The torque transfer assembly as set forth in claim 1, wherein said first sun gear positioned axially forwardly of said second sun gear, said first sun gear having an inner radially extending hub portion offset rearwardly from an outer radially extending tooth rim portion, said first sun gear having its toothed rim portion located adjacent said first forwardly positioned carrier ring and its hub portion splined to said first output shaft, said first sun gear rim and hub portions being joined by a frusto-conical sectioned web portion, said web portion having its forward facing surface defining an annular recess formed with internal splines, said second sun gear having an outer radially extending toothed rim portion adjacent said second rearwardly positioned carrier ring and an inner radially extending hub portion journally supported on said output sahft such that said second sun gear hub portion is rearwardly offset from said second sun gear rim portion, said second sun gear rim and hub protions being joined by a frusto-conical sectioned web portion, said first and second sun gear web portions defining complementary juxtaposed nested frusto-conical surfaces providing an axially compact space-saving arrangement.

5. The torque transfer assembly as set forth in claim 4, wherein said first forwardly positioned carrier ring has a rearwardly extending axial flange portion defining an external annular shoulder, and said first sun gear outer rim portion having a notched out internal annular shoulder radially spaced from said first ring external shoulder whereby said external and internal shoulders journally support annular bearing means therebetween.

6. The torque transfer assembly as set forth in claim 4, wherein said second rearwardly positioned carrier ring having a circular opening formed therein and said second sun gear web portion having an annular external shoulder journally supporting said second carrier ring opening thereon.

7. In a transfer case apparatus including a housing, said transfer case apparatus especially adapted for driving a four-wheel drive motor vehicle having front and rear ground engaging wheels, said apparatus including an input shaft adapted for connection to a transmission of a motor vehicle, a first output shaft aligned on the longitudinal axis of said input shaft and having a pilot end portion on its fore end journally supported for rotation in an axial counter bore formed in the aft end of said input shaft, said first output shaft having its fore end supported for rotation in said housing drivingly connected to the rear ground engaging wheels and a second output shaft supported for rotation in said housing drivingly connected to the front ground engaging wheels, said input shaft having an enlarged hollow aft end formed with external sun gear teeth of a single planetary gear set high and low range gear reduction assembly, said single planetary gear set assembly including forward and rear carrier rings with said rear carrier ring formed with internal splines, an intermediate sleeve concentrically surrounding said first output shaft for relative rotation therewith, a range clutch collar having internal and external splines formed thereon, said range clutch collar internal splines slidably engaged with external splines adjacent one end of said intermediate sleeve, a mode clutch collar having internal splines slidably engaged with external splines adjacent the other end of said intermediate sleeve, a dual helical planetary differential gear assembly comprising fore and aft axially spaced carrier rings rotatable about the principal axis of said first output shaft, first and second juxtaposed toothed sun gears concentrically disposed about said first output shaft, said first sun gear fixed to said first output shaft and having its teeth at a first uniform radius, said second sun gear journalled on said first output shaft and having its teeth at a second uniform radius a predetermined distance less than said first radius, means interconnecting said second sun gear with said second output shaft, first and second sets of toothed pinion gears having identical uniform diameters rotatably supported on first and second sets of axially extending pins, respectively, between said fore and aft rings; said first and second sets of pins journalled between said fore and aft carrier rings at first and second radial distances outward from said central axis, whereby said first radial distance is a predetermined distance greater than said second radial distance, the teeth of each said first set pinion gear extending a first predetermined axial distance substantially equal to the axial extent of both said first and second sun gear teeth, the teeth of each said first set pinion gear positioned in meshing engagement with said first sun gear teeth while forming a predetermined clearance with said second sun gear teeth, the teeth of each said second set gear extending a second axial distance about one-half the axial extent of each said first set pinion gear teeth so as to be substantially equal to the axial extent of said second sun gear teeth and in meshing engagement therewith, said first and second sets of pinion gears disposed in paired relation such that the teeth of each first set pinion gear is in meshing engagement with the teeth of a corresponding second set pinion gear, said first sun gear having a predetermiend number of gear teeth greater than the number of gear teeth on said second sun gear, said first carrier ring having an internally splined opening concentrically disposed about said first output shaft, said first sun gear having an annular recess therein formed with internal splines axially aligned with and adjacent to said first carrier ring internal splines, said mode clutch collar having external spline on one end, said mode clutch collar one end adapted to be shifted axially into said first sun gear annular recess such that its external splines engage said first sun gear internal splines, wherein said first output shaft is driven by drive torque transferred thereto from said input shaft via said mode clutch collar and said first sun gear, and wherein upon said mode clutch collar being shifted axially away from said first sun a gear a first predetermined distance such that said mode clutch collar external splines egage both said first sun gear internal splines and said first carrier ring internal splines, wherein said dual planetary differential is placed in a lock-up conditon with no differentiation provided between said first and second output shafts, and whereby upon said mode clutch being shifted axially away from said first sun gear a second predetermined distance such that said mode clutch collar external splines engage only said first carrier ring internal splines such that differentiation is provided by said dual planetary differential between said first and second output shafts, and wherein the drive torque supplied to said input shaft is divided between said first and second output shafts in a ratio proportional to the number of teeth on said respective first and second sun gears.

8. The transfer case as set forth in claim 7, wherein said range clutch collar external splines selectively engaged with internal splines formed in said input shaft enlarged hollow aft end providing a high drive range position, said range clutch collar splines non-engaged providing a neutral position, and said range clutch collar splines engaged with internal splines formed on said single planetary gear set rear carrier providing a low drive range position, whereby upon said range clutch collar being shifted axially on said intermediate sleeve providing, in combination with said mode clutch collar, a two-wheel high range drive state, a four-wheel high range locked drive state, a four-wheel high range with interaxle differentiation, a neutral state, and a four-wheel low range locked drive state with no interaxle differentiation.

* * * * *